(12) United States Patent
Cull et al.

(10) Patent No.: US 7,210,568 B2
(45) Date of Patent: May 1, 2007

(54) APPARATUS FOR ORGANIZING ARTICLES TRAVELING ON A CONVEYOR

(75) Inventors: James Cull, Ottawa (CA); John Lawrence, Ottawa (CA); Paul R. Pearl, Ottawa (CA)

(73) Assignee: Dipix Technologies Inc., Ottawa (CA)

( * ) Notice: Subject to any disclaimer, the term of this patent is extended or adjusted under 35 U.S.C. 154(b) by 0 days.

(21) Appl. No.: 11/191,010

(22) Filed: Jul. 28, 2005

(65) Prior Publication Data
US 2006/0021852 A1 Feb. 2, 2006

Related U.S. Application Data

(60) Provisional application No. 60/592,116, filed on Jul. 30, 2004.

(51) Int. Cl.
*B65G 47/26* (2006.01)

(52) U.S. Cl. .................. 198/442; 198/445; 198/451

(58) Field of Classification Search ............... 198/442, 198/443, 451, 452, 453, 445
See application file for complete search history.

(56) References Cited

U.S. PATENT DOCUMENTS

| | | | | |
|---|---|---|---|---|
| 1,416,763 A | * | 5/1922 | Thom ........................ | 198/445 |
| 1,657,630 A | * | 1/1928 | Lund ......................... | 198/445 |
| 2,325,816 A | * | 8/1943 | Waters ....................... | 198/445 |
| 3,179,230 A | * | 4/1965 | Brown ....................... | 198/442 |
| 4,265,356 A | * | 5/1981 | Glover ....................... | 198/444 |
| 4,723,649 A | | 2/1988 | Hartness et al. | |
| 5,660,283 A | | 8/1997 | Moncrief et al. | |
| 5,937,995 A | | 8/1999 | Hartness et al. | |

FOREIGN PATENT DOCUMENTS

JP 4-345425 * 12/1992 ................ 198/445

* cited by examiner

*Primary Examiner*—James R. Bidwell
(74) *Attorney, Agent, or Firm*—Thomas Adams (57) ABSTRACT

In laner apparatus for automatically arranging articles into lanes on a conveyor, for example for packaging or further processing, the articles are fed onto a conveyor upstream of a fence that extends at an acute angle to the direction of travel of the conveyor. The fence has gateways at intervals along its length and gates that control passage of the articles through the gateways and into lanes downstream of the fence. These downstream lanes may feed the articles onto slides for packaging or further processing. Articles that do not pass through a gateway move to the downstream end of the fence by the reaction forces resulting from motion of the conveyor and the angle of the fence. A control unit reads signals from sensors which are placed downstream of the fence, and preferably downstream of the laner apparatus, to determine whether each downstream lane is full and sends signals to selectively open and close the gates.

39 Claims, 7 Drawing Sheets

APPARATUS FOR ORGANIZING ARTICLES TRAVELING ON A CONVEYOR

CROSS-REFERENCE TO RELATED APPLICATIONS

This application claims priority from U.S. Provisional patent application No. 60/592,116 filed Jul. 30, 2004, the contents of which are incorporated herein by reference.

DESCRIPTION

1. Technical Field

The invention relates to apparatus for organizing articles traveling on a conveyor into lanes and is especially, but not exclusively, applicable to apparatus for arranging baked goods for packaging or further processing.

2. Background Art

In order to facilitate packaging of mass produced articles, such as baked goods, in organized stacks or layers, it is known to channel the articles into a fixed number of lanes on a conveyor belt. Once organized into such lanes, the articles are transferred to automated packaging machinery for packaging or to other machinery for further processing.

Usually, it is desirable for none of the lanes leading into the packager to be empty, and many production lines are attended by personnel who ensure that the articles are distributed evenly across the lanes. Continuous staffing is costly and prone to disruption during shift changes, personal breaks and unplanned absences. Also, the articles may be accidentally damaged by personnel during handling. Consequently, it is known to use so-called "laner" apparatus instead of personnel.

Known laners for automatically organizing articles into lanes include active and passive kinds. U.S. Pat. No. 4,723, 649 (Hartness et al.), for example, discloses an active laner in which a single line of articles are discharged via a pivoting chute into different ones of a plurality of lanes. A disadvantage of such an arrangement is that it is complicated and expensive to make, and requires significant maintenance.

In passive laners, a mass of articles traveling along a conveyor are separated into lanes by means of "passive" dividers which extend generally parallel to the feed direction. A disadvantage of such laners is that they are prone to jamming if some of the articles are abnormal (e.g., because of size faults, shape faults or unusual texture or stickiness). Passive laners may also become easily jammed when a new product is introduced into the laner after a change in the production line. This disadvantage may be important in a situation where a production line is switched to a different product to meet a short-term demand or to create inventory.

Moreover, passive laners are prone to jamming when several articles arrive at the entrance to a lane simultaneously in "nested" relation. For example, in a bakery, an arrangement of three buns with one leading and two others behind it and in contact at either side may halt at a divider, triggering a dam-up that solidly blocks a conveyor as more and more buns arrive. In the course of a normal production day, with hundreds of thousands of articles passing by, such problems are noticeably frequent. A further disadvantage of known passive laners is that clumping at the entrances to some of the lanes may lead to irregular distribution of the articles across the lanes.

The problem of clumping or jamming has been addressed in various ways. For example, U.S. Pat. No. 5,937,995 discloses a laner having a plurality of side-by-side lanes, each tapering into a narrowed portion. The upstream ends of the lanes receive a mass of articles on a conveyor and the lanes taper inwards to streamline the mass of articles into two lines. The articles are then separated into single file by introducing an additional divider in each lane. To reduce jamming and assist in the single-file arrangement wedge-shaped protrusions extending laterally from the side walls of the lanes are provided slightly upstream of the additional divider. In addition, U.S. Pat. No. 5,937,995 teaches the use of a first conveyor feeding the articles into the lanes and a second conveyor conveying them along the lanes. The first conveyor runs more slowly than the second conveyor so as to alleviate jamming.

U.S. Pat. No. 5,660,263 (Moncrief et al.) also discloses a passive laner having a plurality of side-by-side lanes. In this laner, the upstream ends of the dividers defining the lanes extend obliquely across the conveyor between opposite side rails. According to Moncrief et al., arranging the entrances obliquely tends to close any spaces between the articles as they progress, ensuring that the articles are in nested configuration. A series of wedges, each slightly upstream of the entrance to a respective one of the lanes, divert the articles laterally so that the adjacent divider is generally aligned with a tangential contact point between an approaching pair of articles and so separates the nested articles smoothly, allowing higher operating speeds without damage.

The laners disclosed in both U.S. Pat. No. 5,937,995 and U.S. Pat. No. 5,660,263 are not entirely satisfactory for use with different types of articles. Both systems operate by forcing the articles into a nested pattern, then relieving the nesting. They might work satisfactorily with solid articles, such as bottles, but they would be prone to jamming when used for soft articles such as buns, which would tend to compress rather than nest. In addition, neither patent discloses means for achieving a balanced distribution of articles across the lanes.

DISCLOSURE OF INVENTION

The present invention seeks to eliminate, or at least mitigate, one or more of the disadvantages of the prior art, or at least provide an alternative.

According to a first aspect of the present invention, there is provided apparatus for organizing into lanes articles conveyed in bulk by a conveyor, the apparatus comprising a conveyor for feeding the articles, a fence extending across the conveyor at an acute angle to the direction of travel of the conveyor, means defining a plurality of lanes downstream of the fence for receiving the articles, a plurality of gates spaced apart along the length of the fence, each gate controlling access to a respective one of the plurality of lanes, and control means for controlling each of the gates selectively to control entry of articles into the corresponding lane.

The apparatus may further comprise a receptacle adjacent the conveyor at the downstream end of the fence to collect articles that did not enter any of the lanes.

Alternatively, a second conveyor means may be provided alongside the first conveyor for receiving articles that did not enter any of the lanes and returning the received articles to the first conveyor at a position upstream of the fence. Where such a second conveyor is provided, a discharge opening may be provided adjacent the side of the second conveyor furthest from the first conveyor, and at the downstream end of the fence, to permit collection of articles that did not enter any of the lanes and overflowed from the second conveyor.

According to a second aspect of the invention, there is provided apparatus for use with a conveyor system to organize articles traveling along the conveyor into lanes, said apparatus comprising a conveyor for feeding the articles; a fence and means for supporting the fence so as to extend across the conveyor at an acute angle to the direction of travel of the conveyor; means defining a plurality of lanes downstream of the fence for receiving the articles; a plurality of gates spaced apart along the length of the fence, each gate controlling access to a respective one of the plurality of lanes, and control means for opening and closing each of the gates selectively to control entry of articles into the corresponding lane.

Preferably, the gates are slidable across the lanes and close towards the upstream end of the fence.

A plurality of deflection means may be provided upon the upstream side of the fence, each adjacent an upstream edge of a respective one of the gates, for deflecting articles moving generally downstream along the fence so that they move slightly upstream before they encounter the gate and enter the lane, if clear, away from its upstream edge.

Where a second conveyor means is provided, the control means may also vary the speed of the second conveyor means, perhaps obviating the need for an overflow receptacle. The control means may control the speed of the second conveyor in dependence upon signals from at least one additional sensor means that detects articles on the second conveyor means.

Preferred embodiments of either aspect of the invention further comprise sensor means for detecting when a predetermined number of articles have entered a particular lane and providing a corresponding detection signal, the control means then being responsive to the detection signal to close the corresponding gate. The sensor means may be provided downstream of the fence and may comprise two sets of sensors, one set upstream of the other, each set comprising a plurality of sensors for detecting articles in the plurality of lanes, respectively. The sensor means could even be provided downstream of the entire apparatus, conveniently disposed over lanes on an existing conveyor to which the apparatus is interfaced, when in use.

Various objects, features, aspects and advantages of the present invention will become more apparent from the following detailed description, taken in conjunction with the accompanying drawings, of a preferred embodiment of the invention which is provided by way of example only.

DETAILED DESCRIPTION OF PREFERRED EMBODIMENTS

Figure 1:
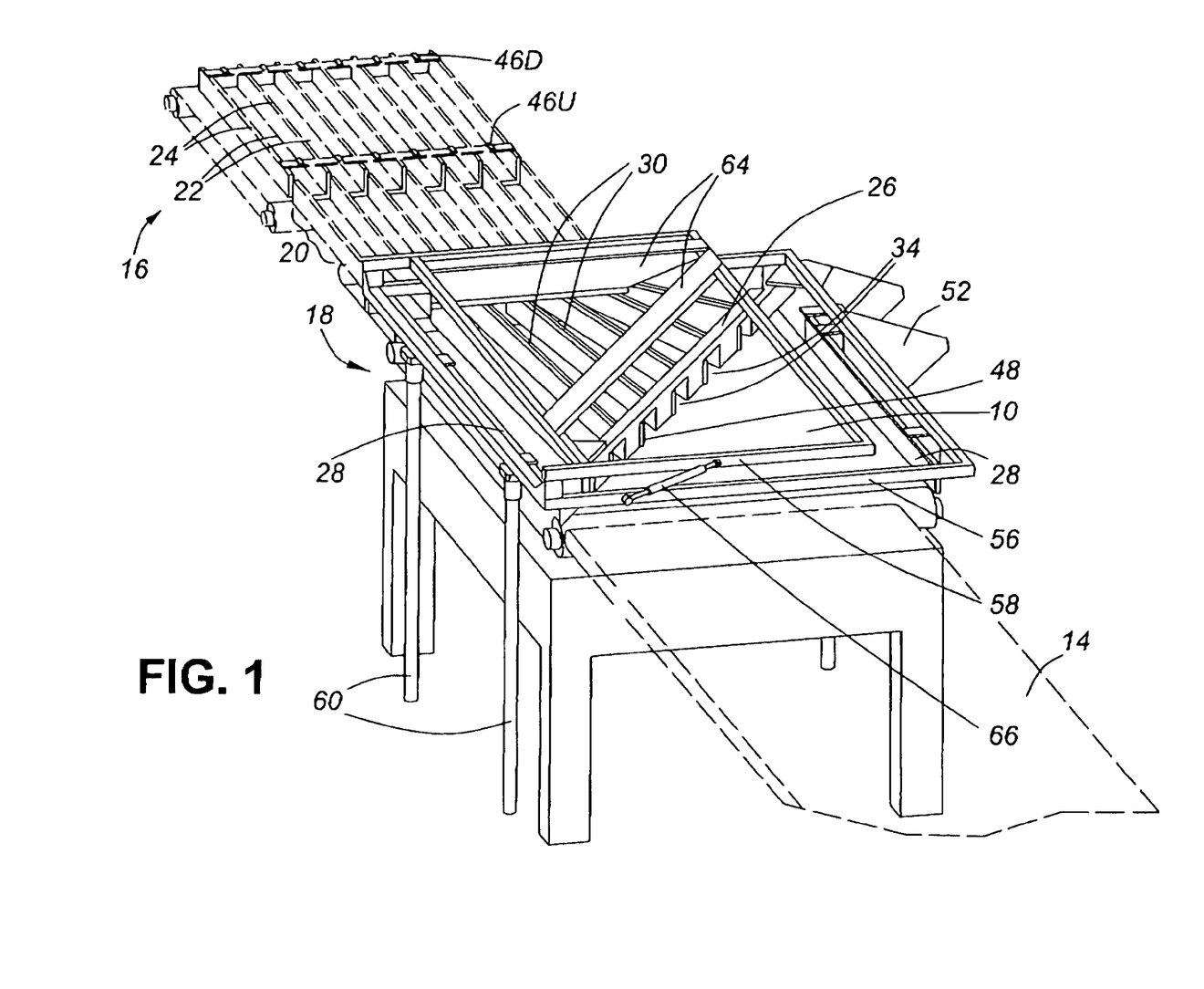
FIG. 1 is a schematic perspective view of laner apparatus for arranging articles on a conveyor into lanes.
Figure 2:
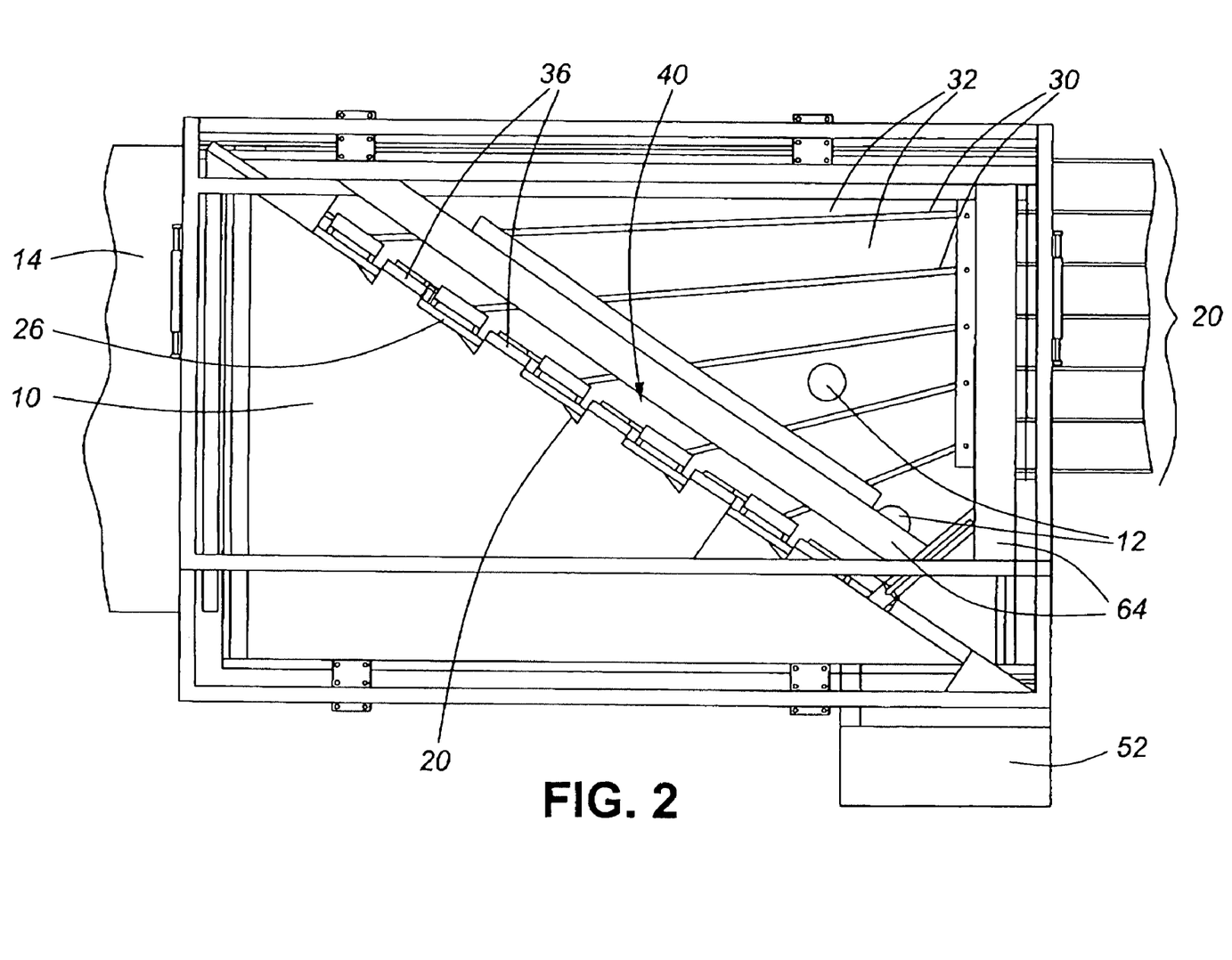
FIG. 2 is a plan view of the apparatus.

FIGS. 1 and 2 illustrate a conveyor 10 for transporting articles 12, specifically baked goods such as hamburger buns, from an upstream conveyor 14 to a downstream conveyor 16 of a mass production system. Mounted above the conveyor 10 is laner apparatus 18 for organizing the buns into columns for depositing via slides 20 into respective lanes 22 formed between partitions 24 on the downstream conveyor 16.

The laner apparatus 18 comprises a fence 26 which extends obliquely across the conveyor 10, slightly above its surface, between opposite side barriers 28. A plurality of partitions 30 extending between the fence 26 and slides 20 define a plurality of lanes 32 each communicating with a respective one of the slides 20. Side barriers 28 to either side of the laner apparatus 18 prevent the buns from falling off the edge of the conveyor 10 and also form the outer walls of the outermost lanes. The buns 12 are fed onto the conveyor 10 by the upstream feed conveyor 14.

Figure 3:
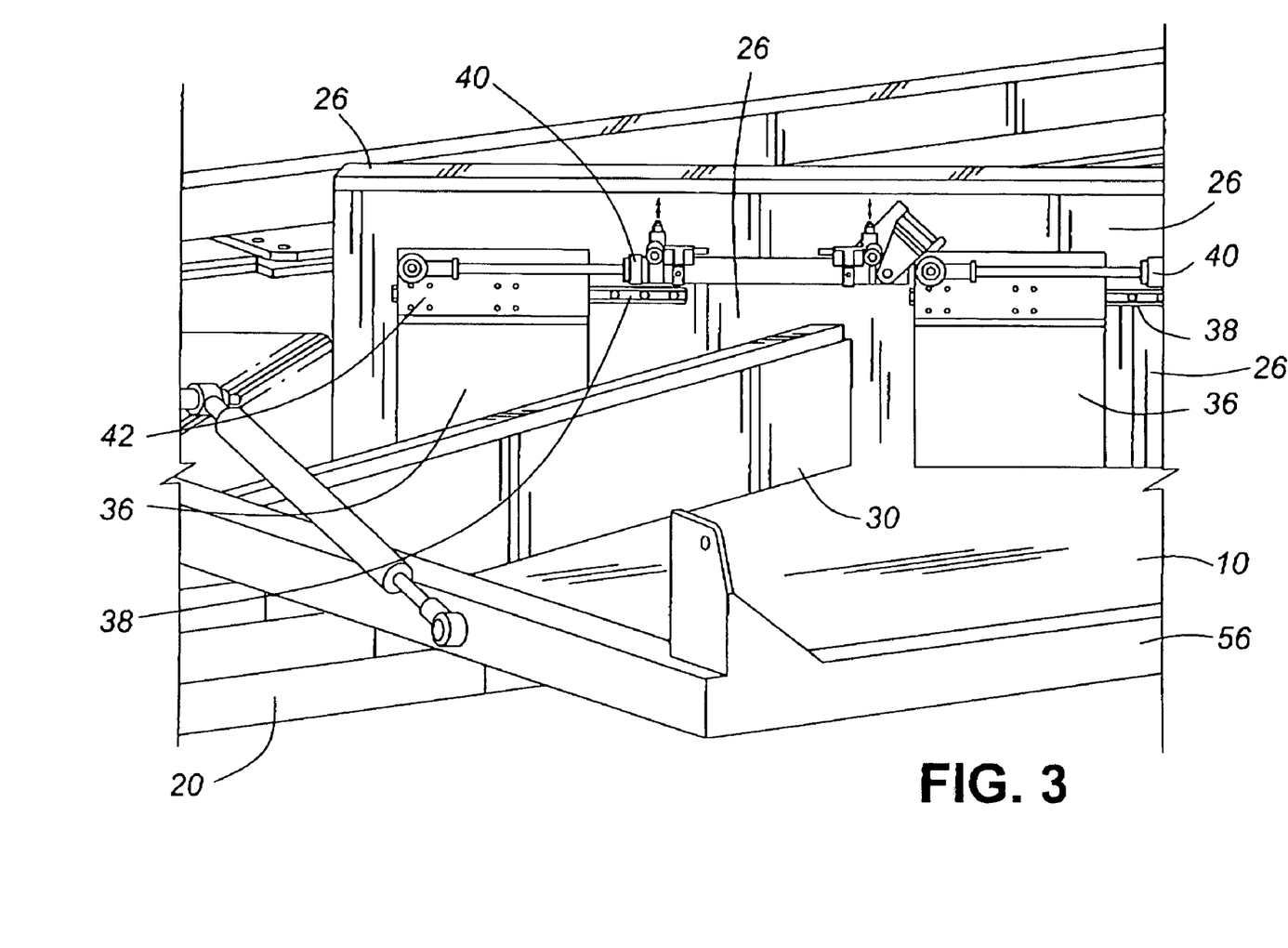
FIG. 3 is a detail view of a part of the apparatus.

The fence 26 has a plurality of gateways 34, each opening into a respective one of the lanes 32. The gateways 34 are sized to permit only one bun 12 to pass through at a time. A corresponding plurality of gates 36 slidably mounted upon the downstream surface of the fence 26 are operable to open and close the upstream ends of lanes 32, respectively. As shown in detail in FIG. 3, the gates 36 are suspended from ceramic coated rails 38 and can be slid to and fro by piston-and-cylinder devices 40. To close the gateways, the gates 36 are slid towards the upstream end of the fence 26. The rails 38 have a C-shaped cross-section with upper and lower lips. Each gate 36 is suspended by a pair of runners 42 that slide to and fro in the rail 38 as the gate 36 is opened and closed to control access to the corresponding lane 32 by the buns 12.

Figure 5:
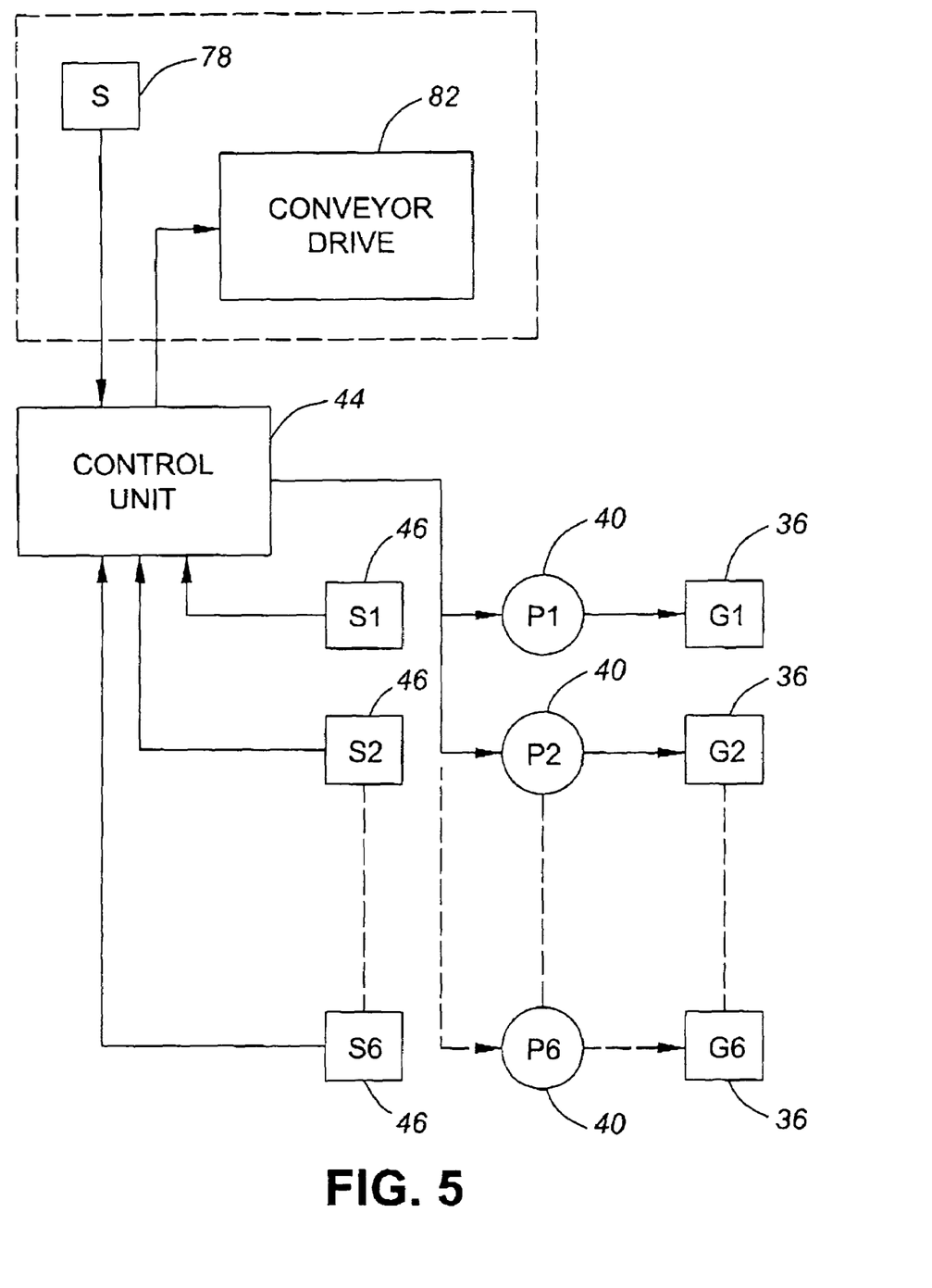
FIG. 5 is a diagram of the control system.

Referring also to FIG. 5, a control unit 44 controls the gates 36 in response to signals from a plurality of sensors 46, for example optical sensors, each mounted in such a way that it can detect the presence or absence of a bun 12 in the corresponding one of the downstream lanes 22. The sensors 46 are arranged in two sets, one set 46U close to the slides 20 and the other set 46D further downstream. Each set comprises one sensor over each lane. The spacing between the two sets of sensors determines, in effect, the length of a buffer zone. When both upstream and downstream sensors for a particular lane simultaneously detect an underlying bun, the buffer associated with that lane is full, i.e., it carries a required number of buns to ensure continuous supply to whatever downstream location requires it. It should be noted that the upstream and downstream sensors are not necessarily at the ends of the lanes. Hence, the buffer may be full without the lane being full.

When the upstream and downstream sensors 46U and 46D in the same lane simultaneously detect buns, they supply their corresponding detection signals to the control unit 44 which closes the associated one of the gates 36. The control unit 44 may also be programmed to open and close the gates 36 to ensure that the buns 12 are evenly distributed amongst the lanes 22.

When a bun 12 arrives at a particular one of the gates 36 that is closed, it will be deflected along the fence 26 by virtue of the lateral reaction forces generated by the motion of the conveyor 10 and the angle of the fence 26. It will be appreciated that the buns will be deflected in the same way at each of the gates 36 along the fence 26. Although, in most cases, the buns 12 will move downstream along the fence 26, it is possible that an accumulation of buns 12 may cause one or more to be deflected upstream along the fence 26.

If two buns arrive at a particular one of the gateways 34 one behind the other, either they will enter sequentially, or the trailing bun will deflect off the leading bun and slide onto the solid portion of the fence, thus missing that particular one of the gateways 34 and moving on to the next of the gateways 34; and so on until it reaches a gateway it can enter.

A plurality of wedge-shaped deflectors 48 are provided on the upstream side of the fence 26, each adjacent the upstream edge of a respective one of the gateways 34. As a bun 12 deflected downwards along the fence 26 encounters a particular deflector 48, it will be urged away from the adjacent gateway by a small distance, in the upstream direction, so that it enters the gateway away from its upstream edge. This reduces the likelihood of the bun 12 being trapped between the associated gate 36 and the edge of the gateway 34 if the gate is closing as the bun 12 begins to pass through the gateway.

A discharge opening 50 in the side barrier 28, where the downstream end of the fence 26 meets the side of the conveyor 10, allows buns 12 which have not passed through any of the gateways 34 to overflow from the conveyor 10 into a discharge chute 52 placed at the discharge opening 50, which directs the buns 12 into a receptacle 54 for disposal or, if desired, to be returned to the conveyor 10 upstream of the fence 26. The discharge chute 52 is useful if a downstream failure occurs and the buns 12 cannot be accepted quickly enough, or in the event that incoming buns 12 are malformed and cannot pass through any one of the gateways 34.

If desired or necessary, such malformed buns could be removed before reaching the fence 26, conveniently by hand or automatically using, for example, an automated product analysis system. A suitable such system is the Dipix CS24/In line sold by Dipix Technologies Inc., Ottawa.

Two frames 56 and 58 support the laner apparatus 26 above the conveyor 10. The outer frame 56 is attached to four support posts 60. The inner frame 58 is attached to the outer frame 56 by two hinges 62 at the side of the conveyor 10 closest to the upstream end of the fence 26. The partitions 30 are each attached at one end to the fence 26 and attached at intervals along their lengths to support beams 64. Both the fence 26 and the support beams 64 are also attached to the inner frame 58. The inner frame 58 can be lifted away from the conveyor 10, pivoting about hinges 62, and supported in the raised position by means of a pair of pneumatic telescopic struts 66. With the fence 26 raised, buns 12 may pass unimpeded when it is not necessary to organize them into columns and there are no downstream lanes at which the buns would jam. When the inner frame 56 is lifted away from the conveyor, the overflow discharge opening 50 is closed, conveniently by means of an additional gate 68, so that the buns 12 do not fall off the side of the conveyor 10.

The laner apparatus described above could be supplied with its own conveyor 10 and inserted into an existing conveyor system, conveniently between an existing upstream feed conveyor 14 and downstream conveyor 16. However, it would also be possible to supply the laner apparatus without the conveyor 10 and install it above a section of conveyor in an existing system, i.e. "retrofit it".

Figure 4:
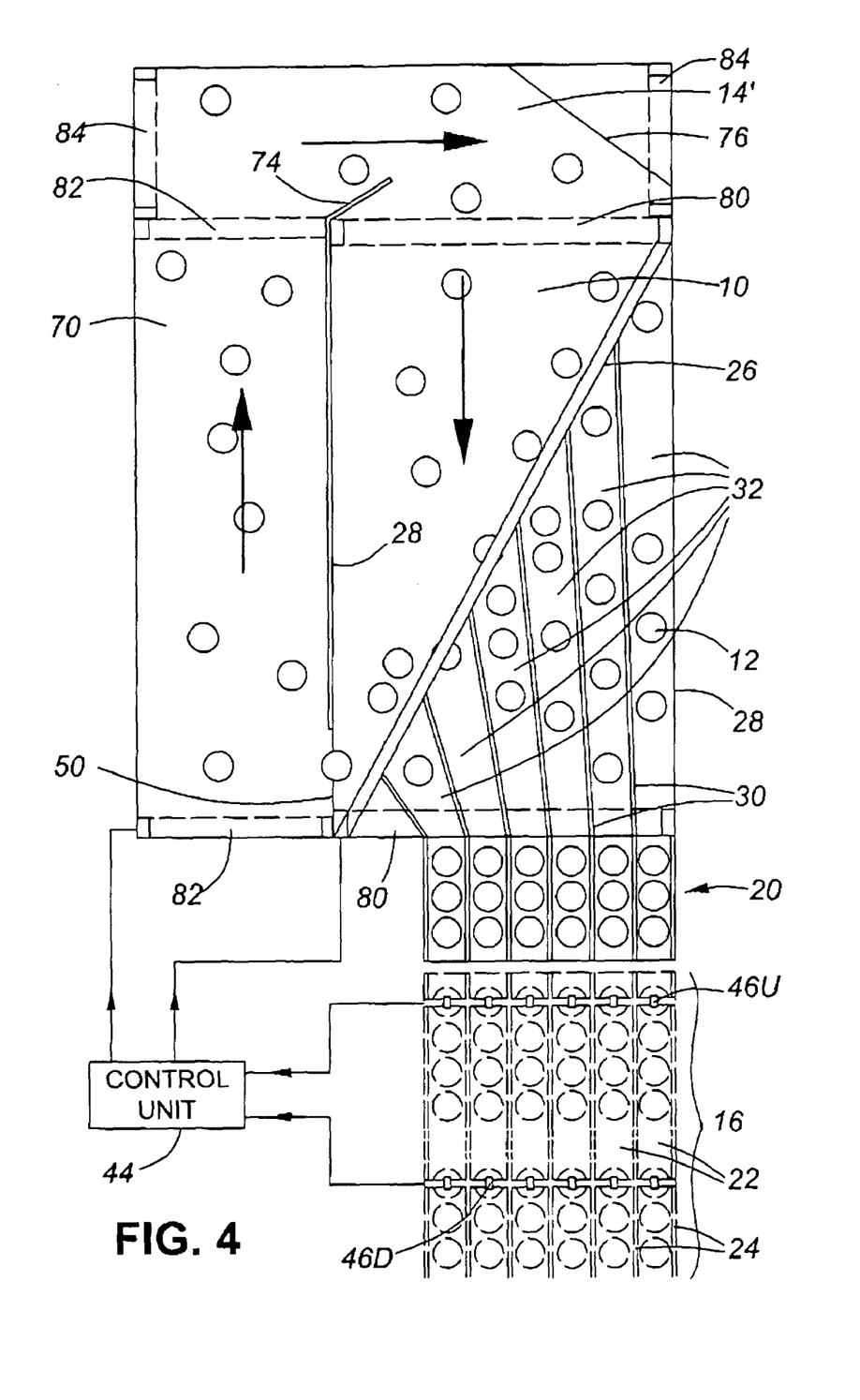
FIG. 4 illustrates a modification.

It would also be possible to dispense with the discharge chute 52 and provide additional conveyors to re-circulate the buns 12 that did not get fed into the lanes 32. Such a modification is shown schematically in FIG. 4 wherein the buns 12 passing through the discharge opening 50 are received by a second conveyor 70 which has a direction of travel opposite to the main conveyor 10. This second conveyor 70 feeds onto an upstream feed conveyor 14' which corresponds to the conveyor 14 of FIG. 1 but differs in that it has a direction of travel that is orthogonal to the second conveyor 70, such that the buns 12 are returned to the main conveyor 10 upstream of the fence 26. Two baffles 74 and 76 at the sides of the conveyor 10 direct returning buns 12 towards the upstream end of the fence 26. Preferably, the first, second, and third conveyors are belt conveyors operable by drives 80, 82, and 84 respectively.

The second conveyor 70 may be a variable speed conveyor, its speed being controlled by the control unit 44, conveniently in response to signals from an additional sensor 78 (see FIGS. 1 and 5), such that the recirculating buns 12 can be accumulated on the second conveyor 70 according to the volume of buns 12 on the main conveyor 10.

Various modifications are feasible within the scope of the present invention. Thus, the sliding gates 36 could be replaced by modified gates that close towards the downstream end of the fence 26.

Figure 6:
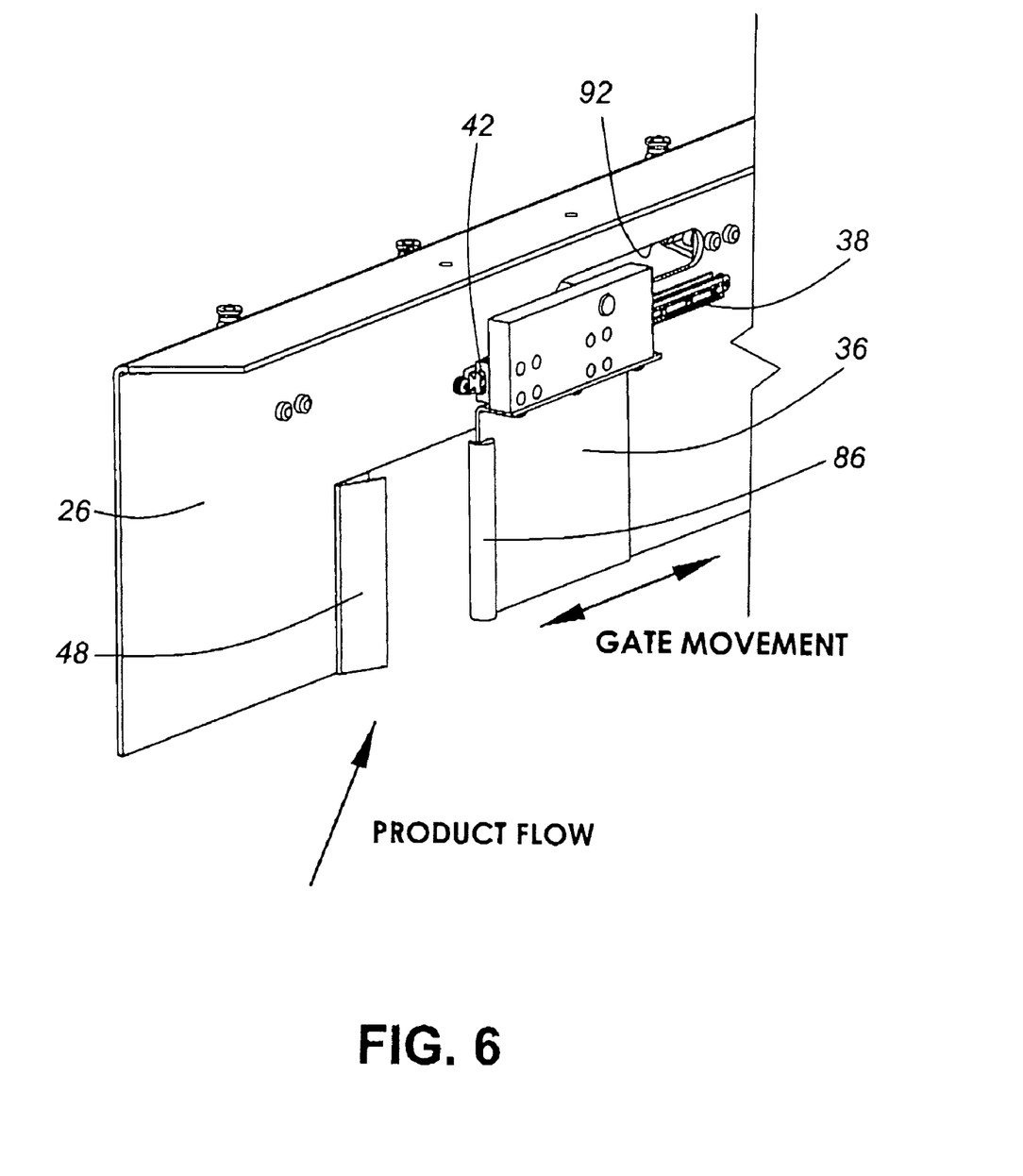
FIG. 6 illustrates the upstream side of the gate mechanism of another modification.
Figure 7:
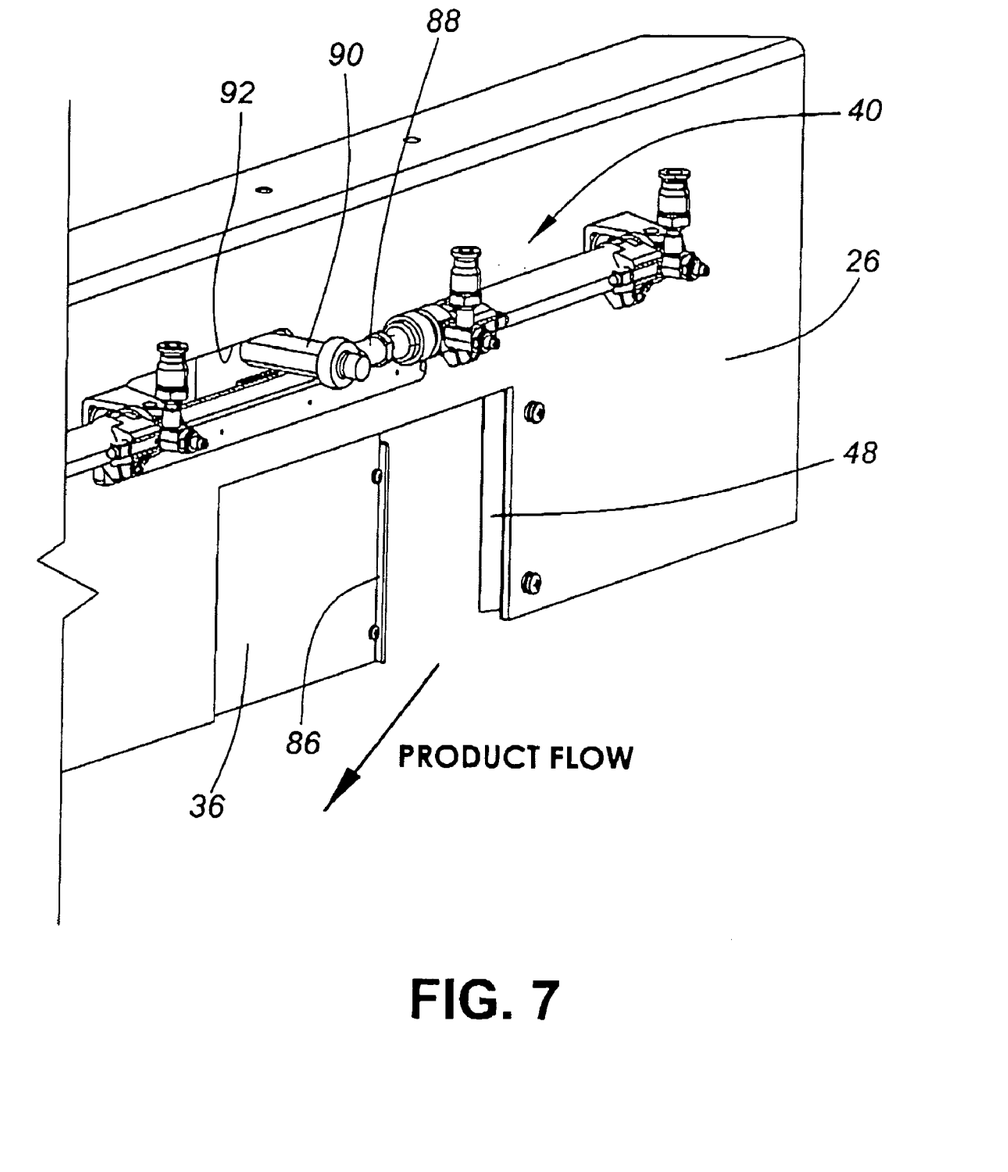
FIG. 7 illustrates the downstream side of the gate mechanism of FIG. 6.

Although, in the above-described embodiment, the gates and piston-and-cylinder devices are on the downstream side of the fence, they could be on the upstream side. Moreover, as shown in FIGS. 6 and 7, the gates could be on one side of the fence and the piston-and-cylinder devices on the other side. FIG. 7 shows the connecting rod 88 of the piston-and-cylinder device 40 connected to the gate 36 by a short link 90 extending through an elongate slot 92 in the fence.

Also, as shown more clearly in FIG. 6, but also in FIG. 7, the leading edges of the gates may be fitted with rounded buffers 86 to reduce the likelihood of damage to the buns 12 through contact with the leading edges of the gates 36 as they close. Of course, these buffers may be applied to the gates in the other embodiments as well.

It might be desirable for the distal end portions of the gates to be bent towards the stream of articles, say for about one quarter of their length. The bent or curved gate portions would reduce the possibility of buns 12 jamming at each of the gateways 34.

It is envisaged that the control means could be arranged to "jiggle" a particular one of the gates 36, i.e. move it slightly and quickly to and fro, if the sensors 46 detected that no buns 12 were being received by the corresponding one of the downstream lanes 22 while the gate 36 was open and neighboring lanes 24 were receiving buns 12. Such conditions would suggest that the gateway was blocked, so jiggling of the gate 36 might dislodge the blockage.

It is also envisaged that the struts 58 could be hydraulic or mechanical and could be motorized and controlled by the control unit.

Although the laner apparatus described herein is used for handling buns, it is to be clearly understood that the apparatus could be used for other articles, especially articles of regular geometrical shape. As mentioned earlier, irregularly shaped articles could be screened out upstream of the fence. Moreover, the laner need not deposit articles into a packaging station but could simply leave them in lanes on the conveyor, perhaps for further treatment.

It will be appreciated that the upstream set of sensors could be mounted over the lanes of the laner apparatus itself. Indeed, in some cases, it might be desirable to mount both sets over the laner apparatus. It might also be possible to dispense with one set of sensors and use the other set to detect the buns.

Although the gates described herein are opened and closed by piston-and-cylinder devices, it is to be understood that other means could be employed, such as chains and motor-driven sprockets. Moreover, the gates could be raised and lowered instead of slid from side-to-side. Also, they could be swung open and closed instead of sliding.

INDUSTRIAL APPLICABILITY

Embodiments of the invention may reduce staffing costs in a production line where articles are organized into lanes for packaging or further processing by eliminating the need to have personnel checking that the articles are distributed evenly across the lanes. they may also reduce the risk of damaging the articles by excessive handling. The apparatus disclosed in the specific description is reasonably simple, would be relatively inexpensive to make and would not require significant maintenance, which incurs cost as well. Furthermore, the likelihood of clumping or jamming is reduced. The operating speed of the conveyor system would be greater than the speed at which a human could perform "laning" and even distribution of articles across the lanes. It is also possible that the operating speed of the conveyor system could be further increased depending upon the suitability of the articles to the system.

An advantage of embodiments of this invention, as compared with existing laners in which articles encounter the pointed ends of partitions at the lane entrances, is that the articles roll or slide along the flat surface of the fence until they encounter a gateway therein. Thus, the likelihood of damage to the articles, especially to soft articles such as buns, is reduced.

Although an embodiment of the invention has been described and illustrated in detail, it is to be clearly understood that the sane is by way of illustration and example only and not to be taken by way of the limitation, the spirit and scope of the present invention being limited only by the appended claims.

What is claimed is:

1. Apparatus for arranging articles into lanes comprising:
    a conveyor for feeding the articles;
    a fence extending across the conveyor at an acute angle to the direction of travel of the conveyor;
    means defining a plurality of lanes downstream of the fence for receiving the articles;
    a plurality of gates spaced apart along the length of the fence each gate for controlling a respective one of the plurality of lanes; and
    control means for opening and closing each of the gates selectively to control entry of articles into the corresponding lane.

2. Apparatus according to claim 1, wherein each of the gates are is slidable across the respective lane and closes towards the upstream end of the fence.

3. Apparatus according to claim 1, further comprising a plurality of deflection means disposed upon an upstream side of the fence, each adjacent an upstream edge of a respective one of the gates, for deflecting articles moving along the fence slightly upstream of the gate.

4. Apparatus according to claim 1, further comprising sensor means for detecting when a predetermined number of articles have entered a particular lane and providing a corresponding detection signal, the control means being responsive to the detection signal to close the corresponding gate.

5. Apparatus according to claim 4, wherein the sensor means comprise at least one set of sensors each for detecting presence of an article in a corresponding one of the downstream lanes.

6. Apparatus according to claim 4, wherein the sensor means comprise two sets of sensors, one set disposed upstream of the other, each set comprising a plurality of sensors each for detecting presence of an article in a respective one of the plurality of downstream lanes.

7. Apparatus according to claim 4, wherein the sensors comprise optical detection means.

8. Apparatus according to claim 1, wherein the fence and the means for defining lanes are attached to a frame, whereby they can be lifted away from the conveyor and allow unimpeded passage of the articles.

9. Apparatus according to claim 2, wherein the fence, the lane defining means and the gates are attached to a frame, whereby they can be lifted away from the conveyor and allow unimpeded passage of the articles.

10. Apparatus according to claim 8, wherein said frame is hinged to a support at one side thereof and one or more struts serve to support the frame in the open position.

11. Apparatus according to claim 9, wherein said frame is hinged to a support at one side thereof and one or more struts serve to support the frame in the open position.

12. Apparatus according to claim 1, further comprising a discharge opening adjacent a downstream end of the fence for discharging articles that have not enter any of the gateways lanes.

13. Apparatus according to claim 12, wherein the discharge opening directs articles into a receptacle.

14. Apparatus according to claim 1, further comprising a discharge opening adjacent a downstream end of the fence for discharging articles that have not entered any of the lanes and a slidable gate for closing the discharge opening when said frame is lifted.

15. Apparatus according to claim 9, further comprising a discharge opening adjacent a downstream end of the fence for discharging articles that have not entered any of the lanes and a slidable gate for closing the discharge opening when said frame is lifted.

16. Apparatus according to claim 14, wherein the discharge opening directs articles into a receptacle.

17. Apparatus according to claim 15, wherein the discharge opening directs articles into a receptacle.

18. Apparatus according to claim 12, further comprising additional conveyor means adjacent the downstream end of the fence for collecting articles discharged through the discharge opening and returning them to the first conveyor at a position upstream of the fence.

19. Apparatus according to claim 18, wherein the additional conveyor means comprises at least one baffle for directing said articles towards the upstream end of the fence.

20. Apparatus for installation in a conveyor system comprising at least one conveyor, the apparatus for arranging articles into lanes on the conveyor and comprising:
    a fence and means for supporting the fence so as to extend across the conveyor at an acute angle to a direction of travel of the conveyor;
    means for defining a plurality of lanes downstream of the fence for receiving the articles;
    a plurality of lanes spaced apart along the length of the fence, each gate controlling access to a respective one of the plurality of lanes; and
    control means for opening and closing each of the gates selectively to control entry of articles into the corresponding lane.

21. Apparatus according to claim 20, wherein each of the gates is slidable across the respective lane and closes towards the upstream end of the fence.

22. Apparatus according to claim 20, further comprising a plurality of deflection means disposed upon the upstream side of the fence, each adjacent an upstream edge of a respective one of the gates, for deflecting articles moving along the fence slightly upstream of the gate.

23. Apparatus according to claim 20, further comprising sensor means for detecting when a predetermined number of articles have entered a particular lane and providing a corresponding detection signal, the control means being responsive to the detection signal to close the corresponding gate.

24. Apparatus according to claim 23, wherein the sensor means comprises at least one set of sensors each for detecting presence of an article in a corresponding one of the downstream lanes.

25. Apparatus according to claim 23, wherein the sensor means comprises two sets of sensors, one set disposed upstream of the other, each set comprising a plurality of sensors each for detecting presence of an article in a respective one of the plurality of downstream lanes.

26. Apparatus according to claim 23, wherein the sensors comprise optical detection means.

27. Apparatus according to claim 20, wherein the fence and the means for defining lanes are attached to a frame, whereby they can be lifted away from the conveyor and allow unimpeded passage of the articles.

28. Apparatus according to claim 21, wherein the fence, the lane defining means and the gates are attached to a frame, whereby they can be lifted away from the conveyor and allow unimpeded passage of the articles.

29. Apparatus according to claim 27, wherein said frame is hinged to a support at one side thereof and one or more struts serve to support the frame in the open position.

30. Apparatus according to claim 28, wherein said frame is hinged to a support at one side thereof and one or more struts serve to support the frame in the open position.

31. Apparatus according to claim 20, further comprising a discharge opening adjacent a downstream end of the fence for discharging articles that have not entered any of the lanes.

32. Apparatus according to claim 31, wherein the discharge opening directs articles into a receptacle.

33. Apparatus according to claim 20, further comprising a discharge opening adjacent the downstream end of the fence for discharging articles that have not entered any of the lanes and a slidable gate for closing the discharge opening when said frame is lifted.

34. Apparatus according to claim 28, further comprising a discharge opening adjacent a downstream end of the fence for discharging articles that have not entered any of the lanes and a slidable gate for closing the discharge opening when said frame is lifted.

35. Apparatus according to claim 33, wherein the discharge opening directs articles into a receptacle.

36. Apparatus according to claim 34, wherein the discharge opening directs articles into a receptacle.

37. Apparatus according to claim 31, further comprising additional conveyor means adjacent the downstream end of the fence for collecting articles discharged through the discharge opening and returning them to the first conveyor at a position upstream of the fence.

38. Apparatus according to claim 37, wherein the additional conveyor means comprises at least one baffle for directing said articles towards the upstream end of the fence.

39. Apparatus according to claim 1, further comprising at least one additional conveyor upstream of said conveyor, and at least one additional conveyor downstream of said conveyor.

* * * * *